Nov. 15, 1949  V. S. POTTS  2,488,236
LEVEL CONTROLLED LIQUID DISPENSER
Filed May 22, 1946  2 Sheets-Sheet 1
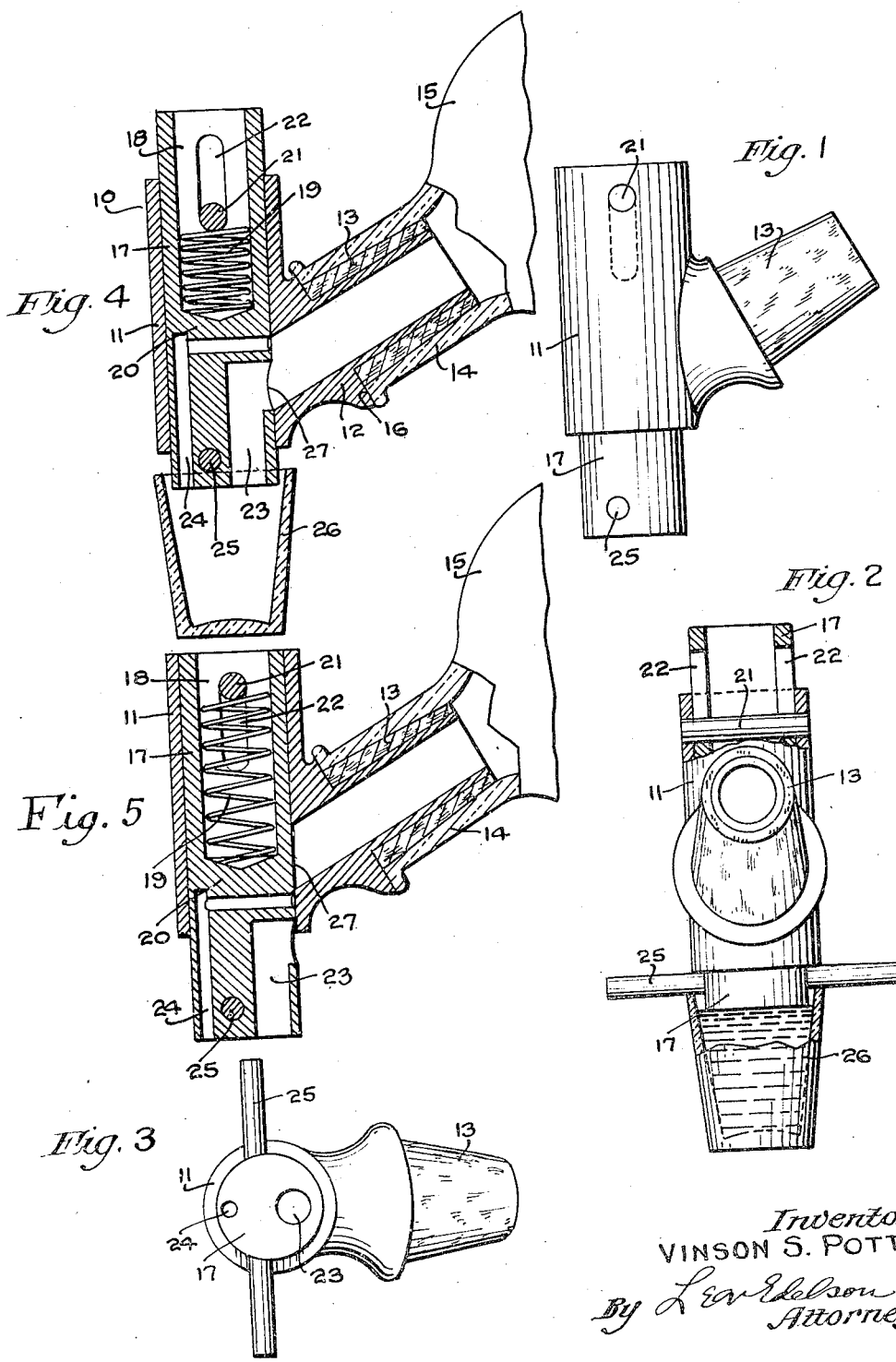
Inventor
VINSON S. POTTS

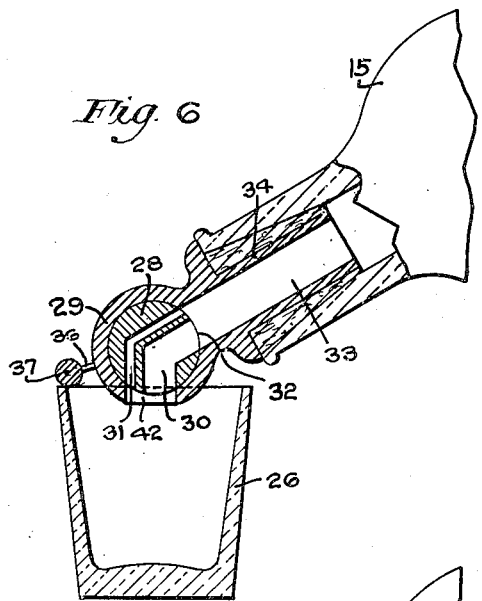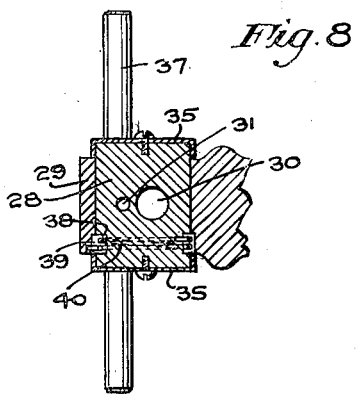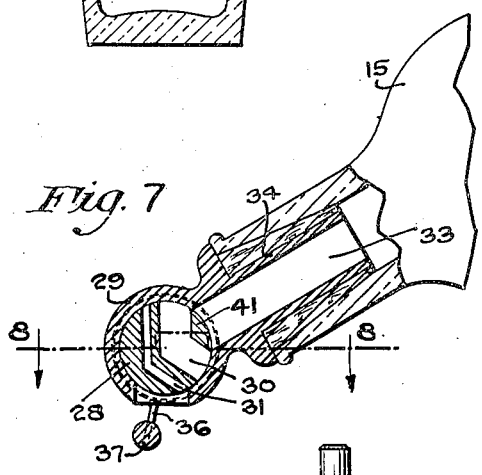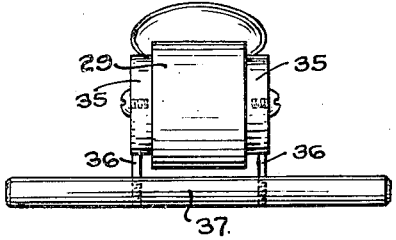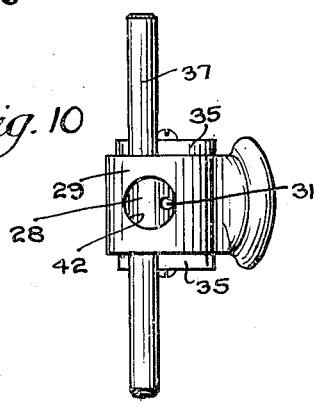

Patented Nov. 15, 1949

2,488,236

UNITED STATES PATENT OFFICE 2,488,236

LEVEL CONTROLLED LIQUID DISPENSER

Vinson S. Potts, Philadelphia, Pa.

Application May 22, 1946, Serial No. 671,511

5 Claims. (Cl. 226—123)

This invention relates to liquid dispensers and more particularly to an improved construction of a combined discharge-faucet and air-supply device for dispensing liquids from bottles or the like.

Among the principal objects of the present invention is to provide a simple and inexpensive and yet exceedingly efficient liquid dispenser which is automatically operable to shut off the flow of liquid from the dispensing vessel when the level of the liquid in the receiver reaches a predetermined point. Thus, the device of the present invention is of particular advantage when employed as a valved dispenser for whiskey bottles and the like, its operation being such that when the liquid poured from the bottle into a glass reaches a certain level in the glass the dispenser automatically shuts off to prevent further flow of the liquid from the bottle, thereby insuring against any possible overflow of the liquid from the glass. The design and construction of the valved dispenser, as will presently appear, being such that automatic control of the liquid flow is obtained regardless of the size of the glass or other receiver into which the liquid is poured, it will be apparent that the present invention insures the pouring of identical quantities of the liquid into glasses of a given size.

Other objects and advantages of the invention will be apparent more fully hereinafter, it being understood that the present invention consists in the combination, construction, location and relative arrangement of parts, all as described more fully hereinafter, as shown in the accompanying drawings and as finally pointed out in the appended claims.

In the drawings, which are illustrative of certain preferred embodiments of the present invention—

Figure 1 is a side elevational view of a valved dispenser constructed in accordance with and embodying the principles of the present invention;

Figure 2 is an end elevational view, partially in section, showing it in association with a glass for receiving the liquid dispensed therethrough;

Figure 3 is a top plan view of the dispenser;

Figure 4 is a sectional view taken on the line 4—4 of Figure 2 showing the relative positions of the dispenser elements when it is operative to permit the flow of liquid therethrough;

Figure 5 is a sectional view showing the dispenser in its normal condition with the liquid and air passages therethrough closed;

Figure 6 is a sectional view illustrating a modified construction of the dispenser of the present invention, showing the same open to permit the free flow of liquid therethrough;

Figure 7 is a sectional view showing the dispenser of Figure 6 closed against passage of liquid therethrough;

Figure 8 is a transverse sectional view taken along the line 8—8 of Figure 7;

Figure 9 is an end elevational view of the modified form of dispenser; and

Figure 10 is a bottom view thereof.

Referring now to the drawings, and more particularly to Figures 1 to 4 thereof, it will be observed that the dispenser, designated generally by the reference numeral 10, includes a main external body member 11 of generally cylindrical form from one side of which laterally projects a tubular extension 12. This tubular extension is preferably formed as an integral part of the body member 11 with its axis inclined with respect to that of the body member, the internal bore of the extension 12 being in free communication with the internal bore of the member 11.

The outer portion of the extension 12 is of reduced external diameter for reception thereon of a tapered sleeve 13 of cork or other such material, the said sleeve serving as a liquid-tight seal between the extension 12 and the neck 14 of the bottle 15 or other receptacle containing the liquid to be dispensed. Preferably, the extension 12 which is adapted to be inserted into the neck of the bottle as shown in Figures 4 and 5 is provided with an annular shoulder 16 which is engaged by the end of the bottle neck when the dispenser is fully inserted therein.

Slidably fitted within the cylindrical body member 11 is a cylindrical plug member 17, the outer portion of which is recessed, as at 18, for accommodation therein of a coiled compression spring 19. The inner end of this spring 19 engages the internal transverse web 20 of the body member 11, while its opposite outer end abuts against a pin 21 which is fitted in the body member to extend diametrically across the internal bore thereof. Not only does this pin serve as the upper stop or abutment for the compression spring, but it also serves to prevent relative rotation of the plug member 17 relatively to the external member 11. For this latter purpose, the plug member 17 is provided in the wall of its recessed portion with a pair of diametrically opposed elongated slots 22—22 through which the pin 21 projects, it being thus apparent that while the plug member is capable of axial movement relatively to the external body member 11 within the limits permitted by the slots 22—22 in co-operation with the transversely extending pin 21, rotation of the plug member relatively to the external body is effectually precluded. The compressive force of the spring 19 is such as to impart a normal bias on the plug member tending to maintain it in the position shown in Figure 5.

The inner portion of the plug member 17 is provided with a pair of passages 23 and 24, both of which are adapted to be brought into common registry with the inclined bore of the lateral extension 12 of the dispenser when the plug member is axially shifted, against the normal bias of the spring 19, into the dispensing position shown in Figure 4. The passage 23, which is of substantially larger cross-sectional area than that of the passage 24, serves as that through which the liquid is dispensed when the dispenser is open, while the smaller passage 24 serves to admit air from atmosphere into the interior of the bottle to insure a steady and uniform flow of the liquid therefrom when the bottle is tilted into discharging position. It will be noted that the outer extremities of the passages 23 and 24 are disposed in a common plane extending substantially normal to the axis of the plug 17.

Extending transversely through the plug member 17 adjacent its dispensing end is a bar 25, the opposite ends of which projects substantially beyond the opposite sides of the plug member. Necessarily, the location of this bar 25 is such that it just engages the lower end of the external body member 11 when the plug member is axially shifted into its position shown in Figure 4 wherein the inner ends of the passages 23 and 24 are commonly in registry with the discharge bore of the lateral extension 12 of the dispenser. In this latter position of the plug member 17, liquid may be freely dispensed from the bottle where the latter is tilted into discharging position as shown.

When it is desired to automatically control the discharge of liquid from the bottle to prevent overflow when the liquid is being poured into a glass 26, as illustrated in Figure 4, the bottle 15 fitted with the dispenser 10 is tilted over the glass and lowered into such position as to cause the bar 25 to engage the rim of the glass. The oppositely extending arms of the bar are of sufficient length to insure engagement with the rims of glasses of widely varying diameters. It will be noted that when so engaged over the glass (see Figures 2 and 4), the discharge extremities of the passages 23 and 24 are disposed somewhat below the upper edge of the glass. By varying the extent to which these passages extend into the glass below its upper edge, variation in the maximum permissible liquid level in the glass may be obtained.

Having initially engaged the glass with the bar 25 as just described, continued downward pressure of the bottle against the glass results in the external body member 11 being axially shifted relatively to the plug member 17 to eventually present the discharge port 27 of the tubular extension 12 in registry with the inner ends of the passages 23 and 24. Immediately upon such registry, liquid from the bottle flows therefrom through the passage 23 into the glass, free flow of the liquid being insured by the simultaneous admission of air from atmosphere into the interior of the bottle by way of the passage 24. This flow of liquid into the glass continues until such time as the liquid level in the glass reaches the plane of the discharge extremities of the passages 23 and 24, when the supply of air is cut off with immediate interruption in further flow of the liquid. Thus, the liquid poured into the glass is prevented from reaching a level therein above that determined by the extent to which said discharge extremities project below the upper edge of the glass. Immediately upon removal of the dispenser from the glass, the plug member 17 is axially shifted by the action of the compression spring 19 into its relative positon shown in Figures 1 and 5 with the result that the discharge port 27 of the tubular extension 12 is sealed against further flow of liquid therethrough. In this closed condition of the dispenser, the passages 23 and 24 are, of course, displaced from the discharge port 27 so that the interior of the bottle is effectively sealed not only against flow of liquid therefrom, but also against entry of air thereinto. Loss of liquid in the bottle by evaporation is thereby effectively prevented.

Figures 6 to 10, inclusive, illustrate a modified construction of dispenser operative in accordance with the principles of the present invention. In this modified arrangement, the plug member 28 is designed for rotary movement within its supporting external body member 29 to present its liquid and air passages 30 and 31 into and out of registry with the discharge port 32 of the main passage 33 communicating with the interior of the bottle 15.

As in the previously described construction, the passage 33 extends through the cork-surfaced tubular extension 34 formed as an integral part of the cylindrical body member 29. This latter is disposed with its axis extending transversely of the glass when the bottle is tilted, as shown in Figures 6 and 7, and in this respect distinguishes from the previous arrangement wherein the external cylindrical body member is coaxial with the glass.

The rotary plug member 28 snugly fits in the bore of the body member 29 with its opposite ends projecting somewhat therefrom. These projecting ends are respectively fitted with cap members 35—35 from which extend a pair of radial arms 36—36. The free extremities of these arms are secured in any suitable manner to the operating bar 37, which is the functional equivalent of the bar 25 of the previously described construction.

As appears most clearly in Figure 8, the coaxial members 28 and 29 are respectively provided with complementally formed annular grooves 38 and 39 in registry with one another to provide a circumferentially extending recess for accommodating a torsion spring 40, the opposite extremities of which are respectively anchored to the plug member 28 and its embracing body member 29. This torsion spring is so operative as to impart a normal bias on the rotary plug member tending to return it always to its closed position shown in Figure 7. In this closed position, the main passage 33 is closed off by the solid wall portion 41 of the rotary plug member, while the operating bar is disposed laterally of the axis of the passage 33.

The external body member 29 is provided in the wall thereof with a discharge opening 42 of a dimension sufficiently large to encompass the discharge extremities of both the liquid and air passages 30 and 31 when the same have been rotated into liquid-flow positions shown in Figure 6. To shift from its open position shown in Figure 6 into its closed position of Figure 7, and conversely, the rotary plug member 28 is rotated through an arc of somewhat less than 90 degrees.

In operation of the dispenser shown in Figures 6 to 10, the operating bar 37 is first caused to engage the edge of the glass into which the liquid is to be poured, following which downward pressure is exerted upon the dispensing head of the device to depress the same into the position shown in Figure 6 wherein the discharge opening 42 is disposed below the upper edge of the glass. In this condition, the dispenser is open and liquid flows freely from the bottle into the glass until such time that the level of the liquid rises sufficiently to cover the opening 42. When this occurs, the supply of air to the interior of the bottle is cut off with immediate interruption in further flow of the liquid, thereby maintaining its level below the upper edge of the glass. Immediately upon disengagement of the dispenser from the glass, the plug member 28 rotates under the influence of the torsion spring into its closed position to thereupon seal the liquid in the bottle.

It will be understood, of course, that the present invention is susceptible of various changes and modifications which may be made from time to time without departing from the real spirit or general principles thereof, and it is intended, therefore, to claim the same broadly as well as specifically as indicated in the appended claims.

What is claimed as new and useful is:

1. A device for dispensing a bottled liquid into an open vessel comprising a main body member having a single passage in communication with the interior of a bottle containing the liquid to be dispensed, a valve body having extending therethrough a pair of passages respectively adapted to discharge liquid from and admit air into said vessel by way of said single passage, said valve body being shiftable within said main body member to present said pair of passages into and out of registry with said single passage, the outer extremities of said valve body passages being so disposed when the valve body is in liquid-dispensing position as to be commonly sealed from atmosphere by the surface of the liquid poured into the receiving vessel whereby to control automatically the level of the liquid discharge into said receiving vessel, spring means operative to shift said valve body into position to close said single passage in the main body member automatically upon withdrawal of said dispenser from contact with the liquid in said receiving vessel, and means fixed to said valve body and adapted to engage the upper edge of the receiving vessel to hold said valve body stationary relatively to said main body member when the latter is pressed toward said vessel for controlled discharge of the liquid into the receiving vessel.

2. A device for dispensing a bottled liquid into an open vessel comprising a main body member having a passage for the delivery therethrough of liquid from a dispensing bottle into a receiving vessel, a valve body disposed within said main body member having extending therethrough a liquid discharge passage and an air admission passage, said valve body being shiftable relatively to said main body member to commonly present said liquid discharge and air admission passages into and out of registry with the passage through said main body member, and means operatively associated with the valve body for maintaining said valve body stationary while effecting movement of said main body member relatively to said receiving vessel whereby to permit the discharge of liquid into the receiving vessel simultaneously as air is admitted into the interior of the dispensing bottle, the outer extremities of said valve body passages being adapted for disposition within and below the upper edge of the receiving vessel whereby said outer extremities may be sealed by the liquid rising to a predetermined level in the receiving vessel and so interrupt the further flow of liquid from the dispensing bottle, said last-mentioned means being in the form of a bar adapted to straddle the upper edge of the receiving vessel.

3. A device for dispensing a bottled liquid into an open vessel comprising a main body member having a passage for the delivery therethrough of liquid from a dispensing bottle into a receiving vessel, a valve body disposed within said main body member having extending therethrough a liquid discharge passage and an air admission passage, said valve body being shiftable relatively to said main body member to commonly present said liquid discharge and air admission passages into and out of registry with the passage through said main body member, and means operatively associated with the valve body for maintaining said valve body stationary while effecting movement of said main body relatively to said receiving vessel whereby to permit the discharge of liquid into the receiving vessel simultaneously as air is admitted into the interior of the dispensing bottle, the outer extremities of said valve body passages being adaped for disposition within and below the upper edge of the receiving vessel whereby said outer extremities may be sealed by the liquid rising to a predetermined level in the receiving vessel and so interrupt the further flow of liquid from the dispensing bottle, said last-mentioned means being in the form of a bar adapted to straddle the upper edge of the receiving vessel, and spring means for effecting reverse movement of said body member relatively to said valve body upon disengagement of said bar from the receiving vessel.

4. In a liquid dispensing device of the character defined in claim 3 wherein said valve body is shiftable rectilinearly with respect to said main body member.

5. In a liquid dispensing device of the character defined in claim 3 wherein said valve body is shiftable angularly with respect to said main body member.

VINSON S. POTTS.

REFERENCES CITED

The following references are of record in the file of this patent:

UNITED STATES PATENTS

| Number | Name | Date |
|---|---|---|
| 525,744 | Roth | Sept. 11, 1894 |
| 1,165,711 | Ransom | Dec. 28, 1915 |
| 1,500,347 | Stubbers | July 8, 1924 |
| 1,635,444 | Sowell | July 12, 1927 |
| 1,790,228 | Chambers | Jan. 27, 1931 |

FOREIGN PATENTS

| Number | Country | Date |
|---|---|---|
| 69,644 | Germany | July 13, 1893 |